(12) United States Patent
Waltz

(10) Patent No.: US 8,151,944 B2
(45) Date of Patent: Apr. 10, 2012

(54) ALGORITHM TO DETERMINE WHEEL AND BRAKE COOLING

(75) Inventor: James Waltz, Brookville, OH (US)

(73) Assignee: Goodrich Corporation, Charlotte, NC (US)

(*) Notice: Subject to any disclaimer, the term of this patent is extended or adjusted under 35 U.S.C. 154(b) by 688 days.

(21) Appl. No.: 12/242,167

(22) Filed: Sep. 30, 2008

(65) Prior Publication Data

US 2009/0125286 A1    May 14, 2009

Related U.S. Application Data

(60) Provisional application No. 60/987,914, filed on Nov. 14, 2007.

(51) Int. Cl.
*F16D 66/00* (2006.01)
(52) U.S. Cl. .................................... 188/1.11 E; 701/29
(58) Field of Classification Search ............. 188/1.11 E, 188/156; 701/3, 29; 702/130; 374/141
See application file for complete search history.

(56) References Cited

U.S. PATENT DOCUMENTS

| | | | | |
|---|---|---|---|---|
| 5,596,513 A * | 1/1997 | Schricker | ...................... | 702/130 |
| 5,651,431 A * | 7/1997 | Kyrtsos | .................... | 188/1.11 L |
| 6,310,545 B1 * | 10/2001 | Sapir | ............................. | 340/453 |
| 7,596,434 B2 * | 9/2009 | Greene | ............................ | 701/29 |
| 7,694,555 B2 * | 4/2010 | Howell et al. | .................... | 73/129 |
| 2002/0191671 A1 * | 12/2002 | Ferrell et al. | ................... | 374/141 |
| 2007/0084682 A1 * | 4/2007 | Griffith et al. | ................ | 188/156 |
| 2009/0114488 A1 * | 5/2009 | Bailey et al. | ............. | 188/1.11 E |

* cited by examiner

*Primary Examiner* — Christopher Schwartz
(74) *Attorney, Agent, or Firm* — Snell & Wilmer L.L.P.

(57) ABSTRACT

A system and device for estimating an amount of time needed for a vehicle brake assembly to cool to a predetermined temperature includes a first input for receiving data indicative of a temperature of the brake assembly, a second input for receiving data indicative of at least one environmental condition that affects cooling of said brake assembly, a processor and memory, and logic stored in said memory and executable by said processor. The logic stored in memory includes logic that simulates a temperature response of the brake assembly based on the brake assembly temperature and the at least one environmental condition.

10 Claims, 2 Drawing Sheets

ALGORITHM TO DETERMINE WHEEL AND BRAKE COOLING

RELATED APPLICATION DATA

This application claims priority of U.S. Provisional Application No. 60/987,914 filed on Nov. 14, 2007, which is hereby incorporated herein by reference in its entirety.

FIELD OF THE INVENTION

The present invention relates generally to brakes for stopping vehicles and, more particularly, to a system, apparatus and method for estimating an elapsed time for a brake and/or wheel to reach a predetermined temperature after braking.

BACKGROUND OF THE INVENTION

Prior to aircraft take-off, many airlines require that the aircraft's brake temperature be cool enough to provide safe emergency operation "rejected take-off" capability. To accommodate this requirement, the temperature of each brake and/or wheel of the aircraft is monitored and output so as to enable aircraft personnel to determine when the temperature of the brakes and/or wheels has reached a "safe" take-off temperature.

To monitor the aircraft brake and/or wheel temperature, brake temperature monitoring systems (BTMS) are employed. These systems typically include one or more temperature sensors (e.g., thermocouples, RTD's, infrared sensors, or the like) at each wheel and/or brake, and a controller operatively coupled to the temperature sensors. Temperature readings as measured by the temperature sensors are communicated to the controller, which in turn processes the temperature data (e.g., by filtering, averaging, scaling, etc.) and outputs the data to a display device, for example, for monitoring on the flight deck.

Due to the inherently slow nature of brake and wheel cooling, brake temperatures can become an issue following a series of closely-spaced routine stops, or following a single high energy stop. Further, short haul aircraft operations with short turn times are prone to brake temperature problems due to residual heat energy in the brakes and/or wheels.

Conventional brake temperature monitoring systems only provide a temperature output, without any indication of the "wait time" for the brake and/or wheel to reach a predetermined safe temperature. Further, many brake temperature monitoring systems require the aircraft to wait 10-15 minutes after landing so as to ensure brake temperatures have reached their peak value.

SUMMARY OF THE INVENTION

It is preferable to minimize the time aircraft are parked at the gate waiting for the brakes and/or wheels to cool to safe temperatures, as this assures cost effective operation by maximizing aircraft utilization rate. A problem with conventional aircraft brake temperature monitoring systems, however, is they merely provide an indication of the current brake temperature, without offering any indication of when the brakes will reach a safe temperature for take-off. Without knowing when the safe temperature may be achieved, aircraft may be unnecessarily held at the gate, which can result in delays.

A device, system and method in accordance with the present invention enable accurate estimation of when a brake and/or wheel temperature will reach a safe or predetermined temperature. This can enable more efficient planning of departure times, thereby maximizing aircraft utilization.

Further, by knowing the time required for the brakes to reach a safe temperature for take-off, and knowing the time required for the aircraft to taxi from the gate to the runway, the aircraft may be permitted to leave the gate prior to the brake and/or wheel temperature reaching the safe temperature. This is due to the fact that any additional cooling needed for the brakes and/or wheels to reach the safe temperature would occur while the aircraft taxis to the runway.

According to one aspect of the invention, a device for estimating an amount of time needed for a brake assembly to cool to a predetermined temperature includes: a processor and memory; a first input operatively coupled to the processor, the first input configured to receive data indicative of a temperature of the brake assembly; and logic stored in memory and executable by the processor. The logic includes logic configured to simulate a temperature response of the brake assembly based on the data indicative of the brake assembly temperature.

According to another aspect of the invention, a brake temperature monitoring system (BTMS) for estimating an amount of time needed for a brake assembly to cool to a predetermined temperature includes: a first sensor operative to provide data indicative of a temperature of the brake assembly; and a controller operatively coupled to the first sensor, the controller configured to simulate a temperature response of the brake assembly based on the brake assembly temperature.

According to another aspect of the invention, a method of estimating an amount of time needed for a brake assembly to cool to a predetermined temperature includes: measuring a temperature of the brake assembly; simulating a brake temperature response of the brake assembly based on the measured temperature; and outputting the brake temperature response.

In preferred embodiments of the invention, at least one additional input is utilized that is indicative of at least one environmental condition that affects cooling of the brake assembly. This environmental data, in conjunction with the measured brake temperature, then can be used to simulate the temperature response of the brake assembly.

Further, a coupled set of differential equations may be solved that simulate the temperature response. The coupled set of differential equations may include an equation that simulates the temperature response of the brake assembly, and an equation that calculates cooling of the brake assembly. Also, the temperature response of the brake assembly may be simulated while the brake assembly temperature is rising.

Preferably, cooling of the brake assembly is updated based on updated values of calculated energy and/or temperature and the at least one environmental condition. The temperature response and/or time needed for the brake assembly to reach the predetermined temperature can be output via a display.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

DETAILED DESCRIPTION

Because the invention was conceived and developed for use in an aircraft braking system, it will be herein described chiefly in this context. However, the principles of the invention in their broader aspects can be adapted to other types of braking systems.

A system, apparatus and method in accordance with the present invention enable accurate estimation of the time required for a vehicle's brakes and/or wheels to cool to safe or predetermined temperatures after a braking operation. Safe temperatures, as used herein, refer to temperatures that are considered acceptable for safe mechanical and/or electrical operation of the braking system.

By providing an accurate estimate of when brake and/or wheel temperatures will reach safe or predetermined temperatures, efficient planning of aircraft departure times is possible. For example, flight personnel can formulate a departure plan based on a known time at which the brakes and/or wheels will reach the safe temperature. Moreover, this departure time may be a specific time period before the brakes actually reach the safe or predetermined temperature.

For example, a brake temperature monitoring system in accordance with the present invention may determine that the brakes and/or wheels, without further energy dissipation by the brake assembly, will reach a safe temperature in a specified time period (e.g., in thirty minutes). Further, it may be known that the time required to depart from the gate and taxi to the runway is ten minutes, and the taxiing process to the runway may add two minutes to the cooling time (e.g., due to light application of the brakes during taxiing). Based on these exemplary time periods, it can be known that the aircraft can depart from the gate prior to the thirty minute time period (e.g., after 22 minutes, which is eight minutes sooner than an aircraft employing a conventional BTMS).

Figure 1:
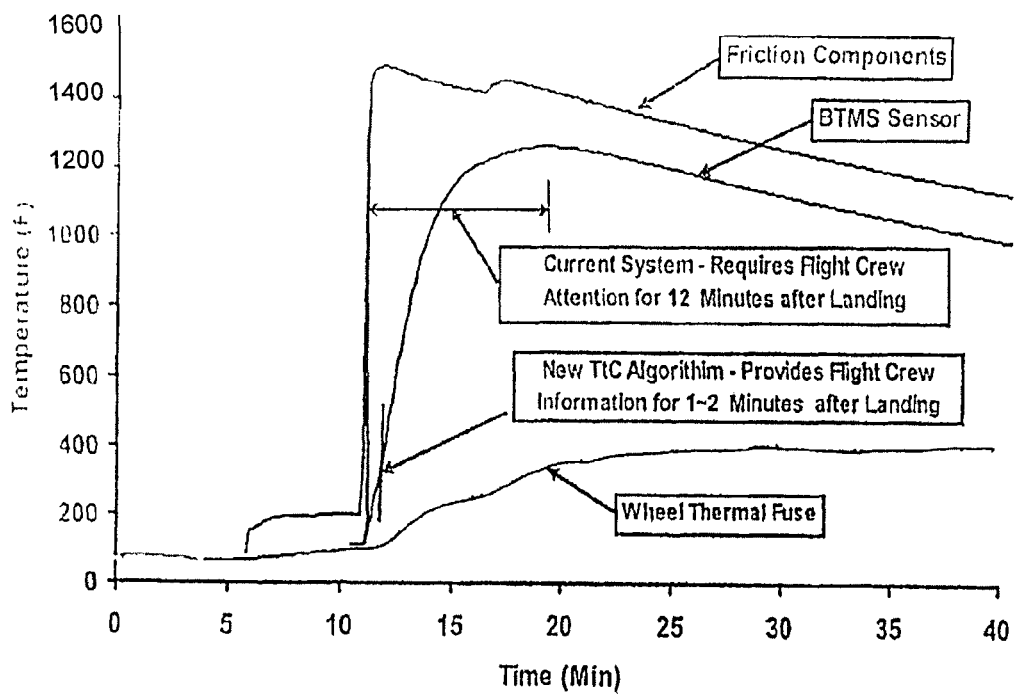
FIG. 1 is a graph showing exemplary temperatures for friction components of a brake assembly after a braking force has been applied by the brake assembly.

FIG. 1 is a graph showing actual brake temperature for brake friction components (e.g., a rotor-disk stack) vs. time, and measured temperature readings for the friction components obtained from a brake temperature sensor. Due to temperature sensor placement and other factors, the measured temperature lags in time and is slightly lower than the actual temperature of the friction components. Because of this time lag, a flight crew using a conventional BTMS must monitor the brake temperature at least until the measured temperature has peaked and starts to decrease (typically 10-12 minutes after landing). As described in more detail below, a BTMS in accordance with the present invention can provide sufficient information 1-2 minutes after landing, without the need to wait for peak temperatures.

Figure 2:
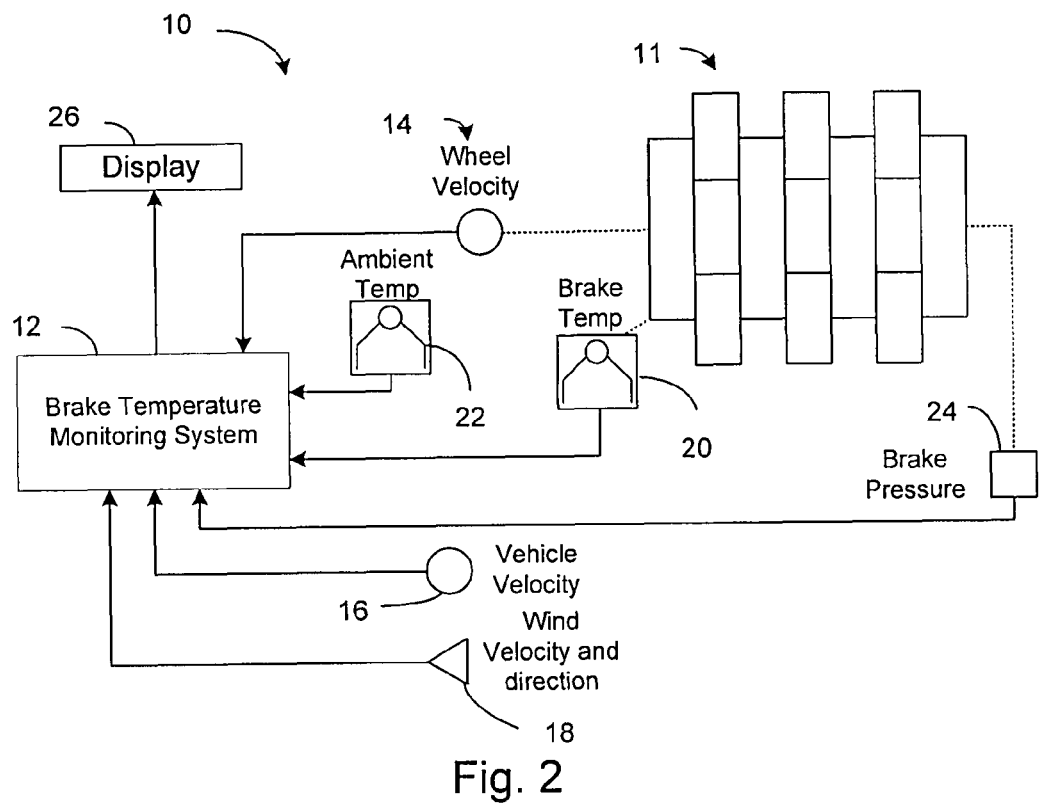
FIG. 2 is a block diagram illustrating components of an exemplary brake temperature monitoring system in accordance with the invention.

Referring to FIG. 2, there is shown an exemplary brake temperature monitoring system 10 in accordance with the invention. The BTMS 10 includes a controller 12, which monitors a temperature of a brake assembly 11. The required cooling time for the brake assembly 11, for example, can be calculated by the controller 12 based on vehicle velocity, wheel speed, brake pressure, brake temperature, wind velocity, wind direction and/or ambient temperature information throughout the brake application and cooling period.

The brake assembly 11 may be a conventional brake assembly that includes a brake disk stack having alternating rotor and stator disks mounted with respect to a wheel support and wheel for relative axial movement. Each rotor disk is coupled to the wheel for rotation therewith and each stator disk is coupled to the wheel support against rotation. The brake head may house a plurality of actuator rams that extend to compress the brake disk stack against a back plate, thereby providing a stopping force.

The controller 12, which may be a microprocessor based controller or the like, is operable to receive input data and to provide output data. The input and/or output data may be in the form of discrete and/or analog I/O, for example. Alternatively, the input and/or output data may be in the form of digital data provided over a cable or wireless medium.

Coupled to the controller 12 are a number of sensors for providing data regarding conditions that affect brake heating and cooling. The sensors may include, for example, a wheel velocity sensor 14, a vehicle velocity sensor 16, a wind velocity and direction sensor 18, a brake temperature sensor 20, an ambient air temperature sensor 22, and a brake pressure sensor 24. It is noted that for sake of clarity, only a single brake temperature sensor 20 and brake pressure sensor 24 are shown in FIG. 1. In practice, however, there may be one or more temperature and pressure sensors for each brake and/or wheel. The sensor data may be provided to the controller 12 either directly (e.g., wired directly to the controller 12) or indirectly (e.g., electronically communicated from another module to the controller 12). Further, some parameters (e.g., vehicle mass, wheel diameter, rotor diameter, vehicle velocity, etc.) may be stored in memory of the controller 12 or calculated from data provided to or known within the controller 12. A display device 26 is operatively coupled to the controller 12, and can be used to provide an indication of the estimated cooling time for the brakes assembly 11.

The wheel velocity sensor 14 provides the rotational velocity (e.g., revolutions per minute) of the vehicle's wheel to the controller 12, while the vehicle velocity sensor 16 provides the vehicle's linear velocity (e.g., feet per second, miles per hour, etc.). The wheel and vehicle velocity sensor may be embodied as an angular displacement device, such as a resolver or encoder, for example, or as some other suitable velocity sensor. As will be appreciated, the linear velocity of the vehicle may be derived from the wheel velocity sensor 14 (assuming a diameter of the wheel is known). Alternatively, the vehicle's linear velocity may be derived from a separate sensor (e.g. an accelerometer).

The brake temperature sensor 20 provides data regarding the actual temperature of the brake assembly 11 (which may include the brakes, wheels and/or associated components). Similarly, the ambient air temperature sensor 22 provides temperature data for the ambient air in the general area around the brakes. Suitable brake and ambient air temperature sensors include thermocouples, RTDs, infrared temperature sensors, or the like.

The brake temperature sensor 20 may be directly mounted on the brake assembly 11, or it may be placed a predetermined distance from the brake assembly. Typically, sensors such as thermocouples or RTDs are mounted on the brake assembly, while contactless type sensors (e.g., infrared sensors) are mounted a predetermined distance from the brake assembly 11. The ambient air temperature sensor 22 can be mounted in any location that is exposed to ambient air.

The brake pressure sensor 24 provides data corresponding to a braking force applied by the brake (e.g., ft-lbs, PSI, etc.). The brake pressure sensor 24 may be an electro-mechanical device that measures a torque or other force applied by the brakes and wheels to stop the vehicle. Alternatively, the brake pressure sensor may be a hydro-electric device that measures a pressure of hydraulic fluid that is used to apply a braking force.

The wind velocity and direction sensor 18, which provides information regarding the wind speed outside the vehicle, is optional. Conventional anemometers and/or wind vanes may be used to determine the wind speed and direction. In the case of an aircraft, the wind speed sensor may comprise part or all of the aircraft's air speed sensor. Wind velocity, for example, may be reported in knots or miles-per-hour, while wind direction may be reported as compass point directions (e.g., north, south, east, west or variations thereof), or as directions relative to the brake assembly 11 (e.g., front, back, side).

The controller 12, for example, uses data obtained from the wheel velocity and vehicle speed sensors, brake temperature sensor, and brake pressure sensor, in conjunction with other data (e.g., vehicle mass, number of brakes, wheel diameter, etc.) to calculate the energy dissipated by each brake. Further, the controller 12, for example, uses data obtained from the wind velocity and direction sensor 18 and the ambient air temperature sensor 22 to calculate the cooling effect experienced by the brakes and/or wheels. Alternatively, the cooling effect may be approximated based on empirical data.

The brake and/or wheel cooling time can be estimated by solving a coupled set of differential equations that simulate brake temperature response. A differential equation based algorithm is advantageous, for example, in that it enables continuous update of the required cooling time based on current values of brake kinetic energy, temperature, aircraft velocity, wind velocity, and ambient temperature. Moreover, the differential equation based algorithm can predict cooling time even though the brake temperature measured by the sensor is still increasing.

The estimated cooling time may be evaluated by solving the differential equations governing heat transfer in the wheel and brake assembly in a two step process, which includes 1) calculation of the energy dissipated by the brakes and/or wheels based on measured temperatures of the brakes and/or wheels, and 2) the cooling of the wheels and/or brakes. Once the data has been calculated, an estimate can be made with respect to the time required for the wheels and/or brakes to cool to a predetermined temperature, as discussed below.

An increase in brake temperature (as detected by the brake temperature sensor 20) during braking operations can be used to trigger the energy calculation steps. With respect to cooling, temperature projections for the wheel and brake can be computed based on the computed energy input alone. However, to increase the accuracy of the computation, it is preferable to further include data pertaining to environmental conditions experienced by the brake assembly. As used herein, environmental conditions include actual environmental conditions (e.g., ambient temperature, wind speed, wind direction, etc.) as well as conditions that affect perceived environmental conditions (e.g., velocity of the vehicle, etc.). The environmental conditions can include, for example, ambient temperature, wind speed, and/or wind direction. The calculations can proceed until wheel temperatures reach maximum.

The temperature response of a wheel and brake system can be approximated by Equation 1, where T is the brake temperature, K is the conduction heat transfer coefficient (W/K), S is the radiation heat transfer, H is the convection heat transfer coefficient (W/K), Cp is the heat capacity (J/Kg K), m is the mass (Kg), t is time (sec), and i and j are wheel and brake components.

$$\sum Kij(Ti-Tj) + \sum Sij(Ti^4 - Tj^4) + \sum Hij(Ti-Tj) = mCp\frac{dTi}{dt} \qquad \text{Equation 1}$$

The coefficients can be considered effective values representing the overall heat transfer rates between various components of the wheel and brake assembly. The coefficients can be initially determined by calculation and finally determined by correlations with the temperature response of a particular wheel and brake combination.

The convection effects on cooling are given by Equation 2, where Nu is the Nusselt number, $Re_T$ is the Reynolds number translational, $Re_R$ is the Reynolds number rotating, Gr is the Grashof number, Pr is the Prandtl number, and C and n are nondimensional empirical constants. The non-dimensional relationships ($Re_T$, $Re_R$, Gr) account for the variation in convection heat transfer cooling rates with environmental conditions.

$$Nu = [C_1 Re_T^n + C_2 Re_R^n + C_3 Gr^n]Pr \qquad \text{Equation 2}$$

In use, temperatures measured by temperature sensors 20 in each brake assembly are transmitted to the controller 12, which computes the cooling time based on Equations 1 and 2 and the energy dissipated by the brake assembly. Required cooling times, updated to reflect current environmental conditions, can be displayed on the display device 26 (e.g., a monitor on the flight deck). Additionally, the possibility of a wheel thermal fuse release also can be determined and a warning message can be output.

An alternative approach to using a coupled set of differential equations includes the use of curve fitting to determine the cooling time of the brake assembly. This approach can be based on a predetermined constant set of operating ambient conditions. The curve fit, however, may not be exact since the brake response is a solution to a nonlinear set of differential equations. More specifically, since the predetermined constants do not take into account continuously changing environmental conditions, accuracy suffers.

Another approach is the use of lookup tables to determine the cooling time of the brake assembly. This approach, however, may be impractical since extensive data files are needed for all combinations of variables.

Figure 3:
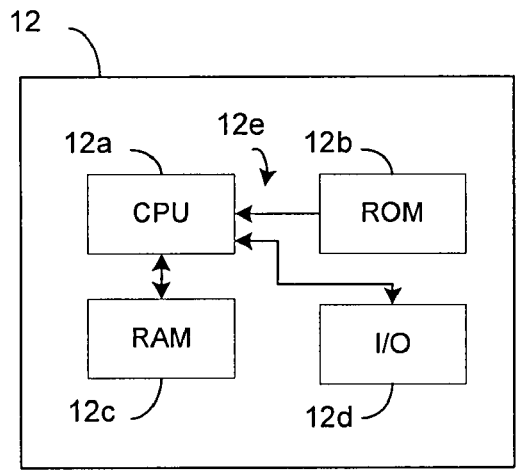
FIG. 3 is a block diagram of an exemplary controller that may be used in the system of FIG. 2.

Moving now to FIG. 3, there is shown an exemplary controller 12 that can be used to implement the method of estimating brake temperature response and/or time for the brakes to cool to a predetermined temperature in accordance with the invention. The controller 12 can include a micro-processor 12a, which executes a time-to-cool algorithm as described herein, non-volatile memory storage in ROM 12b (e.g., to store the time-to-cool algorithm executed by the micro-processor 12a) and RAM 12c for temporary data storage. The controller 12 also may include input/output circuitry 12d to receive data used to estimate the temperature response/cooling time and to output an indication of the temperature response/cooling time. The ROM 12b, RAM 12c and I/O circuitry 12d may be communicatively coupled to the microprocessor 12a via a system bus 12e or the like. Although micro-processors are utilized in the illustrated preferred embodiment, processing could be done analog as opposed to digital, or intermixed with digital processing as may be desired.

Figure 4:
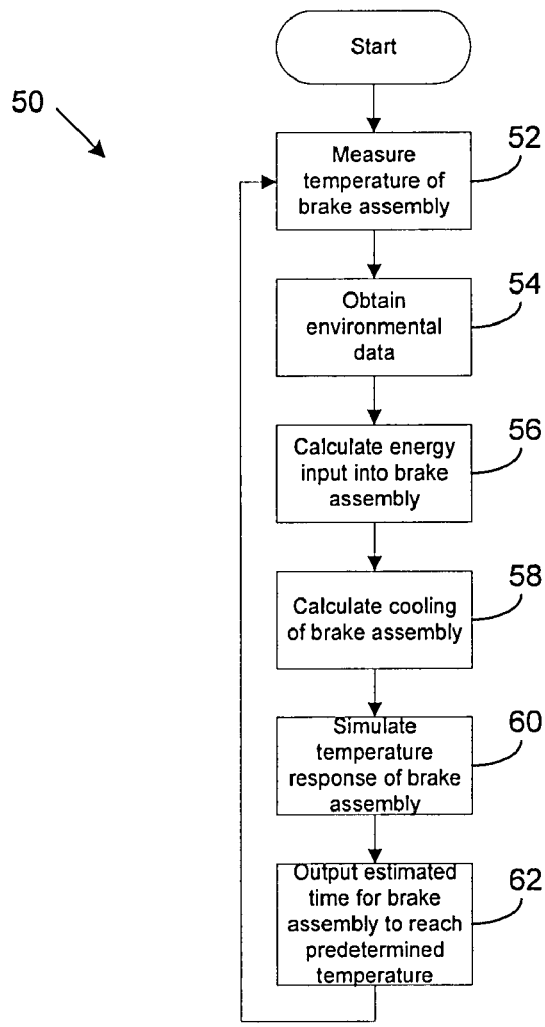
FIG. 4 is a flow diagram illustrating steps for implementing an exemplary time-to-cool algorithm in accordance with the invention.

Moving now to FIG. 4, a flow chart 50 is shown illustrating exemplary steps for estimating the temperature response and/or time for a brake assembly to cool to a predetermined temperature. The flow chart described herein includes a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at block 52, the temperature of the brake assembly is measured. Such measurement may be via temperature sensors (e.g., thermocouples, RTDs, etc.) mounted on or near the brake assembly. The data measured by such sensors then may be input to the controller 12, which may condition and/or scale the signals as is conventional. Next at block 54, environmental data for the brake assembly is obtained. Such environmental data can include, for example, ambient air temperature, wind speed, wind direction, vehicle speed, etc. The environmental data also is input to the controller 21, which again may condition and/or scale the data.

At block 56, the energy input to the brake assembly is calculated. Such calculation can be based on recent braking data, such as a deceleration rate of the vehicle during braking, a braking force applied to the wheels, vehicle mass, number of brakes, braking time, wheel diameter, etc. Calculation of energy input into a brake is well known and, therefore, is not discussed herein. Next at block 58, the cooling of the brake assembly is calculated. Such calculation, for example, may be based on equation 2 discussed herein.

At block 60, the temperature response of the brake assembly is simulated or otherwise calculated. The temperature response can be obtained, for example, using equation 1 discussed herein. In determining the temperature response, the time needed for the brake assembly to cool to a predetermined temperature also can be determined. The temperature response and/or time for the assembly to cool to the predetermined temperature then can be output as indicated at block 62.

A person having ordinary skill in the art of computer programming and applications of programming for computer systems would be able in view of the description provided herein to program a controller 12 to operate and to carry out the functions described herein. Accordingly, details as to the specific programming code have been omitted for the sake of brevity. Also, while software in the memory or in some other memory of the computer and/or server may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A device for estimating an amount of time needed for a brake assembly to cool to a predetermined temperature, comprising:

a processor and memory;

a first input operatively coupled to said processor, said first input configured to receive data indicative of a temperature of the brake assembly, the brake assembly comprising a wheel and a brake;

logic stored in said memory and executable by said processor, said logic including logic configured to calculate a temperature response of the brake assembly based on the data indicative of the brake assembly temperature and data related to the wheel a second input operatively coupled to said processor, said second input configured to receive data indicative of at least one environmental condition that affects cooling of said brake assembly, wherein the logic configured to calculate the temperature response is further configured to calculate the temperature response on the data indicative of the at least one environmental condition, wherein the environmental condition comprises at least one of ambient temperature, wind speed, and wind direction, wherein the logic configured to calculate the temperature response includes logic configured to solve a coupled set of differential equations that calculate the brake temperature response wherein the logic configured to solve the coupled set of differential equations includes logic configured to calculate energy input into the brake assembly based on the temperature of the brake assembly; and logic configured to calculate cooling of the brake assembly based on the calculated input energy and the at least one environmental condition wherein the logic configured to calculate the temperature response of the brake assembly is based on the equation $$\sum Kij(Ti-Tj) + \sum Sij(Ti^4 - Tj^4) + \sum Hij(Ti-Tj) = mCp\frac{dTi}{dt}.$$

2. The device according to claim 1, wherein the logic configured to calculate cooling of the brake assembly is based on the equation $$Nu = \lfloor C_1 Re_T^n + C_2 Re_R^n + C_3 Gr^n \rfloor Pr.$$

3. The device according to claim 1, further comprising logic configured to calculate the temperature response while the brake assembly temperature is rising.

4. The device according to claim 1, further comprising logic configured to output the estimated time needed for the brake assembly to cool to the predetermined temperature.

5. A brake temperature monitoring system (BTMS) for estimating an amount of time needed for a brake assembly to cool to a predetermined temperature, comprising:
a first sensor operative to provide data indicative of a temperature of said brake assembly, said brake assembly comprising a wheel and a brake;
a controller operatively coupled to said first sensor, said controller configured to calculate a temperature response of the brake assembly based on the brake assembly temperature and data related to the wheel
a second sensor operative to provide data indicative of at least one environmental condition encountered by said brake assembly, wherein the controller is further configured to calculate the temperature response based on the data indicative of at least one environmental condition, wherein the environmental condition comprises at least one of ambient temperature, wind speed, and wind direction wherein the controller is configured to solve a coupled set of differential equations that calculate the brake temperature response wherein the controller is configured to
calculate energy input into the brake assembly based on the brake assembly temperature, and
calculate cooling of the brake assembly based on the calculated input energy and
environmental conditions wherein the controller is configured to calculate the temperature response of the brake assembly is based on the equation $$\sum Kij(Ti-Tj) + \sum Sij(Ti^4 - Tj^4) + \sum Hij(Ti-Tj) = mCp\frac{dTi}{dt}.$$

6. The BTMS according to claim 5, wherein the controller is configured to calculate the cooling of the brake assembly based on the equation $$Nu = \lfloor C_1 Re_T^n + C_2 Re_R^n + C_3 Gr^n \rfloor Pr.$$

7. The BTMS according to claim 5, further comprising at least one of an ambient air temperature sensor, a velocity sensor, a brake pressure sensor, and a wind velocity sensor operatively coupled to said processor.

8. The BTMS according to claim 5, further comprising an output device for communicating the temperature response, wherein the controller is configured to output the estimated time needed for the brake assembly to cool to the predetermined temperature.

9. The BTMS according to claim 5, further comprising the brake assembly.

10. The BTMS according to claim 5, wherein the controller is configured to output the estimated time needed for the brake assembly to cool to the predetermined temperature.

* * * * *